UNITED STATES PATENT OFFICE.

EUGEN SPEIDEL, OF PFORZHEIM, GERMANY, ASSIGNOR TO THE FIRM OF FRIEDRICH SPEIDEL, OF PFORZHEIM, GERMANY.

PROCESS OF SOLDERING CHAIN-LINKS.

1,017,818.  Specification of Letters Patent.  Patented Feb. 20, 1912.

No Drawing.  Application filed April 22, 1910. Serial No. 557,011.

*To all whom it may concern:*

Be it known that I, EUGEN SPEIDEL, a subject of the German Emperor, and residing at Pforzheim, Baden, German Empire, have invented certain new and useful Improvements in Processes of Soldering Chain-Links, of which the following is a specification.

My invention has reference to the manufacture of ornamental and other chains from wire provided with a core of solder, and it relates more particularly to a process of preparing the cored wire with a filmlike protective, anti-soldering coating, for the purpose of preventing the links from becoming inter-soldered during the joint-shutting operation.

The various processes now in use for continuously shutting the joints of solder cored wire links result in more or less waste, since in spite of the greatest care numerous links will be found finally to have become inter-soldered, due to imperfect separation of the concatenated links from one another during the soldering operation.

According to one well known process of this kind, the link is first drawn through a deoxidizing agent and this latter removed again except from the faces of the joint where soldering is to take place; next a protective mass in powder form is applied, which is intended to work itself in between the "seat" portions of the links, that is those bent portions where two concatenated links touch when hanging down. The idea is to prevent the oozing solder from spreading unto these seat portions and thus causing stiff-soldering of the joints. It has been found that this procedure is rather uncertain, as during the handling of the chain, after it has been provided with the protective mass (*caput mortuum*, graphite or the like), the latter is apt to drop out again leaving the seat portion unprotected, with resultant inter-soldering. Furthermore, particles of the protective mass are apt to enter in between not tightly closed links, thus preventing formation of a perfect solder joint; and the application of such a protective powder is unclean and highly injurious to the health of the operators. And as the particles of the protective mass do not always cover the surface perfectly, there being porosities and interspaced in such materials, there is apt to be formed little drops or globules of the molten metal on the unprotected sheath metal of the chain link.

The object of the present invention is to obviate these drawbacks, hastening and cheapening the process and reducing the waste to a minimum.

In carrying out my improved process the work piece, for instance a concatenation of chain links, is first coated with a solution of a deoxidizing agent, such as borax, boracic acid, glass fluxes, sodic dihydric orthophosphate, and the like, to prevent oxidation of the metal during the soldering operation; the solvent of this soldering agent is then evaporated and the resulting crystals are removed except from the faces of the joints in any suitable manner, for instance by shaking, rubbing or brushing the chain during or after the drying process. I then produce on the surface of the work piece, in any suitable manner, a thin layer or film of oxid or sulfid or other chemical compound of one of the metals of the alloy of which the shell of the cored wire consists. Thus for example the oxid film may be produced by contacting the metal with sawdust saturated with a weak solution of sulfuric, acetic or other acids, in the presence of air or oxygen, or the sulfid coating may be produced by means of a solution of liver of sulfur. Or alkalis, chlorids (such as chlorid of lime) and the like may be used—if necessary with the aid of the action of light—to produce on the surface of the metal of the work material, a filmlike coating of a chemical compound of such metal suitable for the present process. The links are then subjected to high heat, when the solder fuses and the joints become shut; and the work piece is lastly cleansed in well known manner in alkali baths and by other means, and is then passed on for further operations.

The film of oxid or sulfid or the like produced in the described manner effectively prevents any of the solder which may ooze from the joint from spreading unto adjacent links. There is no danger of a coating thus obtained scaling off or cracking during the ensuing operations, since such oxid or sulfid films are very tenacious and hard, and even should there occur minor injuries to the protective film, they would afterward be covered up again by the oxidation ensuing during the soldering operation.

The filmlike coating of a metal compound produced on the wire of the link in the present operation is very thin and is continuous; it is uniform and coextensive with the surface of the metal. And there is no tendency of the globules or drops of the molten metal to adhere to bare spots on the sheath metal, as is apt to occur in the prior art where separate compositions or substances were mechanically applied. These mechanically applied compositions or substances are generally powders and are discontinuous; the chemically applied coating is continuous.

What I claim is:—

1. Process of preventing inter-soldering of solder-cored metal chain links, consisting in applying a deoxidizer to the work piece, partially removing it again, and chemically producing on the surface of the metal of the work piece an antisoldering filmlike coating of a compound of such metal, substantially as set forth.

2. Process of preventing inter-soldering of solder-cored metal chain links, consisting in applying to the work piece a deoxidizer, partially removing it again, producing on the work piece a film like coating of an oxidized compound of the metal of the metal surface, and heating the workpiece until its core of solder melts and closes the joints, substantially as set forth.

3. Process of preventing inter-soldering of solder-cored metal chain links, consisting in treating the links with a deoxidizing agent, removing the latter again except from the faces of the joints, chemically producing on the metal of the surface of the links a filmlike antisoldering coating of a compound of such metal, and then heating the chain to soldering heat, substantially as set forth.

4. Process of preventing inter-soldering of solder-cored metal chain links, consisting in applying to the work piece a deoxidizer, partially removing it again, chemically producing on the surface of the links a filmlike coating of a compound of the metal of which the links are made, and then heating the links to soldering heat with the ends in contact, substantially as set forth.

5. Process of preventing inter-soldering of solder-cored metal chain links, consisting in applying to the work piece a deoxidizer, partially removing it again, chemically producing on the surface of the metal of the links a compound of a metal component of the shell of the links, and then heating the links to soldering heat, substantially as set forth.

In testimony whereof I affix my signature in presence of two witnesses.

EUGEN SPEIDEL.

Witnesses:
 JOSEPH ROHMER,
 AUGUST OOSTERMAN.